United States Patent
Ronneke et al.

(10) Patent No.: US 9,363,835 B2
(45) Date of Patent: Jun. 7, 2016

(54) METHODS AND NODES FOR IMPROVED NETWORK SIGNALING

(71) Applicant: TELEFONAKTIEBOLAGET L M ERICSSON (PUBL), Stockholm (SE)

(72) Inventors: Hans Ronneke, Kungsbacka (SE); Peter Hedman, Helsingborg (SE); Di Liu, Shanghai (CN); Daniel Nilsson, Alvangen (SE); Lars-Bertil Olsson, Angered (SE); Lasse Olsson, Shanghai (CN); Taowen Zhang, Shanghai (CN); Min Zhu, Shanghai (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 14/242,211

(22) Filed: Apr. 1, 2014

(65) Prior Publication Data

US 2014/0341124 A1 Nov. 20, 2014

Related U.S. Application Data

(63) Continuation of application No. PCT/EP2014/056009, filed on Mar. 26, 2014.

(60) Provisional application No. 61/823,147, filed on May 14, 2013.

(51) Int. Cl.
*H04W 4/00* (2009.01)
*H04W 76/02* (2009.01)

(52) U.S. Cl.
CPC .................................... *H04W 76/02* (2013.01)

(58) Field of Classification Search
None
See application file for complete search history.

(56) References Cited

U.S. PATENT DOCUMENTS

| | | | | |
|---|---|---|---|---|
| 2010/0296448 A1* | 11/2010 | Vainikka | ............... | H04W 92/20 370/328 |
| 2012/0207129 A1* | 8/2012 | Sun | ............................... | 370/331 |
| 2012/0214445 A1* | 8/2012 | Stojanovski et al. | ......... | 455/411 |
| 2013/0083726 A1* | 4/2013 | Jain | ....................... | H04W 4/005 370/328 |
| 2013/0201924 A1* | 8/2013 | Song | ..................... | H04W 76/02 370/329 |
| 2014/0016614 A1* | 1/2014 | Velev | .................... | H04W 4/005 370/331 |
| 2014/0136709 A1* | 5/2014 | Chin | ....................... | H04W 4/12 709/226 |

OTHER PUBLICATIONS

3GPP TR 23.887 V0.9.0, "3rd Generation Partnership Project;Technical Specification Group Services and System Aspects; Machine-Type and other Mobile Data Applications Communications Enhancements (Release 12)", Apr. 2013. 121 pages.
3GPP TS 23.060 V12.0.0, "3rd Generation Partnership Project;Technical Specification Group Services and System Aspects; General Packet Radio Service (GPRS); Service description; Stage 2 (Release 12)", Mar. 2013, 338 pages.

(Continued)

*Primary Examiner* — Edan Orgad
*Assistant Examiner* — Rebecca Song
(74) *Attorney, Agent, or Firm* — Rothwell, Figg, Ernst & Manbeck, P.C.

(57) ABSTRACT

The disclosure relates to methods and nodes for reducing the signaling load in a communications network. One claim of the disclosure relates to a method in a first network node for handling of service requests. The method comprises the steps of: generating a service request message, transmitting the service request message to a second network node, establishing a radio access bearer, RAB, to the second network node, and transmitting uplink data via said RAB to the second network node.

19 Claims, 14 Drawing Sheets

(56) References Cited

OTHER PUBLICATIONS

Ericsson, "Evaluation of SDDTE transmission efficiency", S2-130809, SA WG2 Meeting #96, San Diego, CA, Apr. 8-12, 2013, 26 pages.

3GPP TS 23.401 V12.0.0, "3rd Generation Partnership Project;Technical Specification Group Services and System Aspects; General Packet Radio Service (GPRS) enhancements for Evolved Universal Terrestrial Radio Access Network (E-UTRAN) access (Release 12)", Mar. 2013, 290 pages.

3GPP TR 23.887 V0.10.0, 3rd Generation Partnership Project;Technical Specification Group Services and System Aspects; Machine-Type and other Mobile Data Applications Communications Enhancements (Release 12): Jun. 2013, 134 pages.

Ericsson, "Removing ENs for the Small data fast path solution", S2-132786, SA WG2 Meeting S2#98, Valencia, Spain, Jul. 15-19, 2013, 12 pages.

Ericsson et al., "Small data fast path Establishment," SA WG#2 Meeting #96, S2013080 (revision of S2-13xxx), Apr. 8-12, 2013, 8 pages.

Nokia Siemens Networks et al., "Limitations of Small Data Fast Path," SA WG2 Meeting S2#98, S2-132713, Jul. 15-19, 2013, 10 pages.

Nokia Siemens Networks et al., "Analysis of the Small Data Fast Path solution," SA WG2 Meeting #S2-97, S2-132117 (revision of S2-131710 + S2-131683), May 27-31, 2013, 10 pages.

International Search Report and Written Opinion issued in corresponding application No. PCT/EP2014/056009, dated Apr. 7, 2015, 13 pages.

* cited by examiner

```
E-RABToBeSetupItemBearerSUReq ::= SEQUENCE {
    E-RAB-ID                          E-RAB-ID,
    E-RABLEVELQOSPARAMETERS           E-RABLEVELQOSPARAMETERS,
    TRANSPORTLAYERADDRESS             TRANSPORTLAYERADDRESS,
    GTP-TEID                          GTP-TEID,
    SMART-TUNNEL-INDICATOR            SMART-TUNNEL-INDICATOR
    NAS-PDU                           NAS-PDU,
    IE-EXTENSIONS                     PROTOCOLEXTENSIONCONTAINER
{{E-RABToBeSetupItemBearerSUReqExtIEs}} OPTIONAL,
    ...
}

E-RABToBeSetupItemBearerSUReqExtIEs S1AP-PROTOCOL-EXTENSION ::= {
    { ID ID-CORRELATION-ID            CRITICALITY IGNORE EXTENSION
CORRELATION-ID          PRESENCE OPTIONAL},
    ...
}
```

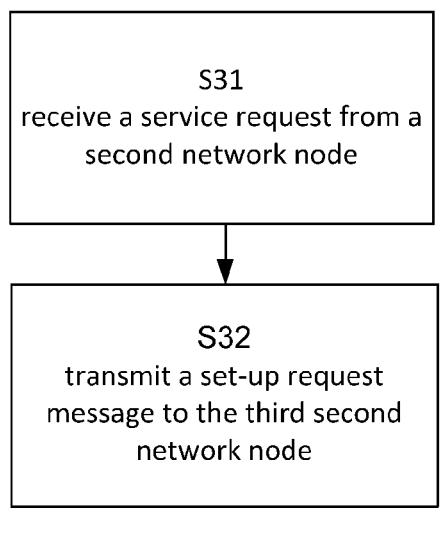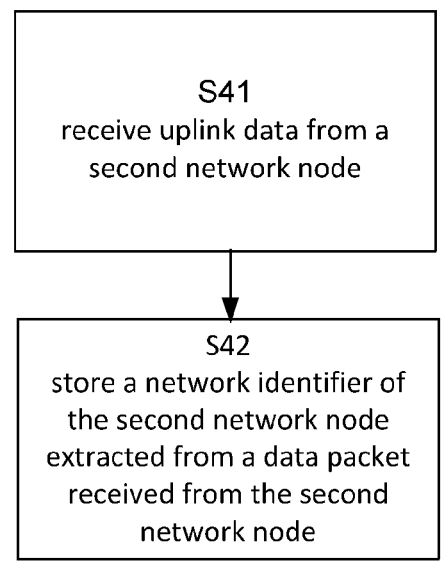
Fig. 14A
Fig. 14B

METHODS AND NODES FOR IMPROVED NETWORK SIGNALING

CROSS-REFERENCE TO RELATED APPLICATIONS

This application claims the benefit of U.S. application No. 61/823,147, filed on 2013 May 14; this application is also a continuation of International Application No. PCT/EP2014/056009, filed on 2014 Mar. 26. The above identified applications are incorporated by reference herein in their entirety.

TECHNICAL FIELD

The present disclosure relates to methods and nodes for reducing the signaling load in a communications network.

BACKGROUND

Today, there is a steady increase of information over wireless communication networks. For example, wireless devices used for M2M (Machine To Machine) communication represent a large portion of such information exchange.

Typically, such M2M communication involves data transfer of relatively small size packets from a UE (User Equipment), i.e., short messages which can be transmitted as bursts of information, and often in a relatively continuous and regular manner. Such signaling may often occur when the UE has entered the so-called ECM-IDLE mode.

With reference to an LTE (Long Term Evolution) type network, it is known that the above-mentioned type of data communication can be established in a manner which involves a service request from a UE which is forwarded to an eNB (evolved Node B) and further to a MME (Mobility Management Entity), via the S1-MME interface. Furthermore, in order to establish a connection for said data communication, there is an exchange of information between the MME and a SGW (Serving Gateway) via the S11 interface.

A problem with the above-mentioned procedure is that it may lead to high demands as regards available CPU processing power and cost, in particular when the M2M communication mentioned above involves UE's which are in the ECM-IDLE mode.

Another problem with the above-mentioned procedure is that a high signaling load is generated in the network and thus an increased processing load on the involved nodes and interfaces. This results in a poor performance and potentially also in a high CAPEX.

SUMMARY

An object of the present disclosure is to provide methods and nodes in a communications network which seeks to mitigate, alleviate, or eliminate one or more of the above-identified deficiencies in the art and disadvantages singly or in any combination and to provide a method and a node with reduced network signaling.

This object is obtained by a method in a first network node for handling of service requests, the method comprising the steps of generating a service request message, and transmitting the service request message to a second network node, and also establishing a radio access bearer, RAB, to the second network node, followed by transmitting an uplink data packet via said RAB to the second network node.

There is also disclosed a method in a second network node for handling of service requests, the method comprising the steps of receiving a service request message from a first network node, and forwarding the service request message to a third network node, and also receiving a set-up request message from the third network node, as well as establishing a radio access bearer, RAB, to the first network node. The method further comprises the step of receiving an uplink data packet from the first network node, and adding a network identifier of the second network node in a header of a data packet, and transmitting the data packet towards a fourth network node.

There is further disclosed a method in a third network node for handling of service requests, the method comprising the steps of receiving a service request from a second network node, and transmitting a set-up request message to the second network node.

The present technique further encompasses a method in a fourth network node for handling of service requests, the method comprising the steps of receiving uplink data from a second network node, and storing at least a network identifier of the second network node extracted from a data packet received from the second network node.

According to various aspects, the first network node constitutes a user equipment node, UE, the second network node constitutes an evolved nodeB, eNB, the third network node constitutes a mobile management entity, MME, and the fourth network node comprises either or both of a serving gateway, SGW, and a packet data network gateway, PGW.

An advantage of aspects of the present disclosure is a decreased network control plane load.

A further advantage of aspects of the present disclosure is a reduced latency in the delivery of data service to, e.g., a UE of the network.

Another advantage of aspects of the present disclosure is an increase in the efficiency of RAB assignment.

Also, extensive service request related signaling to the SGW is avoided for small data transfers. This is a benefit as the number of M2M devices using small data may grow very large.

According to a first embodiment of the present disclosure, a smart user plane method is put forth. According to the method, an eNB will perform an encapsulation of a TEID-U in a data packet for communicating at least over the UL. The MME will not send a modify bearer request to the SGW following reception of a service request, thus saving EPC resources.

According to a second embodiment a modified Service Request procedure is introduced (Service Request with ServiceType: SmallData), that establishes eNB security and provides the eNB with the SGW F-TEID in the normal way, but where the S11 signaling between the MME and the SGW is omitted. This is done by combining the present technique with the method of passing the eNB F-TEID inbound in the GTP-U (as an extension header) on the S1-U as described in a) and b) in 3GPP SA2 TR 23.887 V0.9.0 "Machine-Type and other Mobile Data Applications Communications Enhancements (Release 12)". This means that all bearer related signaling to the SGW is avoided when sending small data, and the amount of signaling the MME needs to do can be reduced.

According to an aspect, a reduced network signaling is achieved by the following procedure:

When the UE wants to communicate in ECM-IDLE mode it will establish a connection to an eNB and onwards to an MME. The MME will answer by sending an RAB establishment request to the eNB where the SGW tunnel endpoint is included. The MME is aware of the SGW tunnel endpoint and address.

The MME will then request the eNB to add an extension header containing the endpoint identifier of the eNB, this communication is done via the S1-U interface. The MME thus do not need to inform the SGW about the endpoint of the eNB, hence S11 signaling is avoided with a reduced signaling load in the network as a benefit.

There is also disclosed herein a computer program, comprising computer readable code which, when run on an apparatus, causes the apparatus to perform the methods disclosed herein.

BRIEF DESCRIPTION OF THE DRAWINGS

Further objects, features, and advantages of the present disclosure will appear from the following detailed description, wherein some aspects of the disclosure will be described in more detail with reference to the accompanying drawings, in which:

FIG. 3 shows a data structure comprising a smart tunnel indicator element.

FIGS. 12-14A and B are flowcharts illustrating aspects of methods of the disclosure.

DETAILED DESCRIPTION

Figure 1:
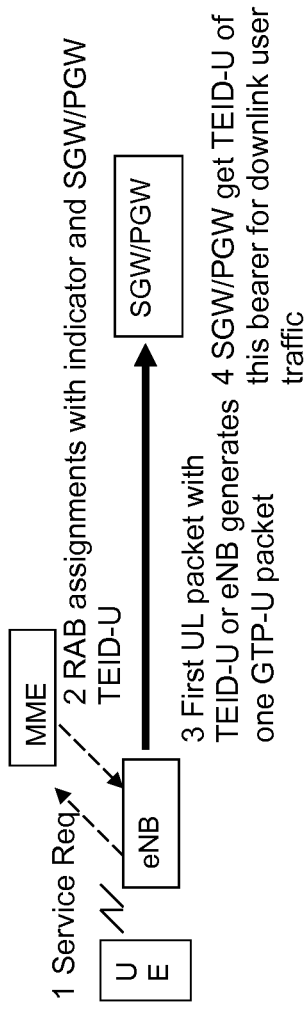
FIG. 1 shows a schematic overview of a network.

Aspects of the present disclosure will be described more fully hereinafter with reference to the accompanying drawings. The methods and nodes disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

Small data transfers that happen when the network has moved a device back to ECM-IDLE mode from, e.g., an ECM-CONNECTED mode, generate high signaling in the network and thus an increased processing load on the involved nodes and interfaces. Instant messaging is one example of the type of small data transfer mentioned above. As a device moves in and out of idle mode the RAB is setup and released frequently, which setup and release contributes to the signaling load of the network.

According to prior art, a UE moving from an idle mode into a connected mode will first send a service request to the network, for instance a service request message to an eNB of the network, which forwards the service request to an MME. When the MME receives this service request from the eNB, the MME will send a modify bearer request towards an SGW/PGW entity. The SGW/PGW then responds by generating a modify bearer response message, following which the MME initiates RAB assignment. Upon assignment of a RAB, the UE can start to transmit uplink data packets to the network, and the PGW can start to transmit downlink data packets towards the UE.

Thus, traditionally, whenever a UE enters active mode, or connected mode, the following three steps are executed by the network: (1) eNB RAB setup with UE, (2) eNB exchanges information with MME, and (3) MME exchanges information with SGW.

However, according to an aspect of the present disclosure the following two steps replace the three steps above: (1) eNB RAB setup with UE, and (2) eNB sends information to SGW directly.

The method of connection which an eNB uses to communicate directly with the SGW varies between different aspects of the disclosure.

According to one aspect the method of connection is by means of a TEID-U, i.e., a tunnel endpoint identifier—user plane. In some networks the TEID-U is part of the GTP-U protocol which is used over S1-U, X2, S4, S5 and S8 interfaces of the Evolved Packet System (EPS). GTP-U Tunnels are used to carry encapsulated T-PDUs and signaling messages between a given pair of GTP-U Tunnel Endpoints. The Tunnel Endpoint ID (TEID) which is present in the GTP header indicates which tunnel a particular T-PDU belongs to. The transport bearer is identified by the GTP-U TEID and the IP address (source TEID, destination TEID, source IP address, destination IP address).

Thus, according to a first embodiment of the present disclosure, a smart user plane method is put forth. According to the method, an eNB will perform an encapsulation using a TEID-U for communicating at least over the UL. The MME will not send a modify bearer request to the SGW following reception of a service request, thus saving EPC resources.

According to an aspect, UPCON is discussed where it is assumed that Load data is included over the user plane, in this case TEID-u information is included in the GTP header.

FIG. 1 shows an aspect of the first embodiment of the present disclosure applied in an LTE context. In FIG. 1 it is assumed that the UE has already established a default PDN/bearer.

Trigger: UE sends service request towards MME.

According to various aspects, the UE can have several different reasons for sending out service request, e.g. UE has data which needs sending when idle, or UE responds to paging.

Figure 2:
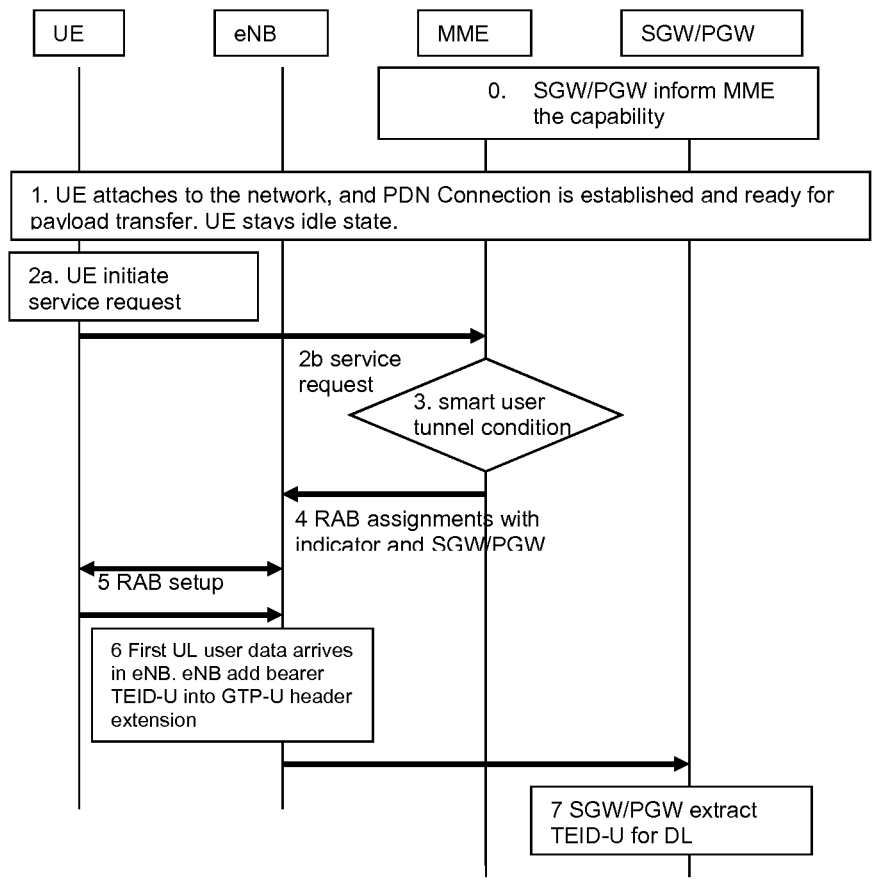
FIG. 2 shows a signaling diagram according to an embodiment of the disclosure.

FIG. 2 shows a service request scenario according to an aspect of the first embodiment of the present disclosure where a UE initiates user traffic. The steps schematically shown in FIG. 2 comprise:

STEP 0: The SGW/PGW informs MME about the capability

STEP 1: UE attaches to the network, and PDN Connection is established and ready for payload transfer. After some time, UE stays idle state.

STEP 2: When UE wants to send out data while in idle status, it will initiate a service request.

STEP 3: MME receives service request (data) from UE and makes a decision whether smart user plane function used or not. If NO, then MME will follow legacy behavior. The decision criteria of the MME mainly depend on SGW/PGW capability to detect/extract TEID-U of eNB from GTP-U.

STEP 4: If YES, i.e., if smart user plane function is used, the MME will send RAB assignment with an indicator, indicating that eNB is to add TEID-U in first UL packets GTP-U extension header.

STEP 5: eNB setup RAB with UE.

STEP 6: UE sends first UL user traffic packet to eNB. eNB will add TEID-U into GTP-U extension header.

STEP 7: PGW/PCEF receives such user packet and extract TEID-U, and store it for DL user data.

An advantage of an aspect of the present disclosure is a decreased network control plane load.

An advantage of an aspect of the present disclosure is a reduced latency in the delivery of data service to, e.g., a UE of the network.

An advantage of an aspect of the present disclosure is an increase in the efficiency of RAB assignment.

According to an aspect, in FIG. 2, the UE receives as part of default and/or dedicated bearer establishment indications for each bearer if they are enabled for smart tunnel or not. The UE only indicates 'small data' in the 2b Service Request message if the bearer intended to be used to send small data is enabled for smart tunnel.

According to an aspect, in FIG. 2, the UE always indicates 'small data' in the 2b Service Request message when it intends to send small data on a bearer. The MME decides based on its own knowledge if bearers are enabled for smart tunnel if it shall indicate usage of smart tunnel to the eNB as part of the RAB setup following the service request.

According to an aspect, in FIG. 2, the UE indicates in the 2b Service Request if 'small data' is to be communicated. The MME uses the 'small data' indication in the Service Request together with knowledge if the eNB supports the smart tunnel method to decide if usage of smart tunnel shall be indicated to the eNB as part of the RAB setup following the service request. The MME learns if the eNB supports smart tunnel as part of a special eNB support indication in the INITIAL UE MESSAGE that carries the 2b Service Request message. Alternatively the special eNB support indication is conveyed to the MME as part of the S1-MME connection establishment.

According to an aspect, in FIG. 2, the UE receives an eNB smart tunnel support indication from the eNB as part of the RRC connection setup that is done as part of the 2b Service Request message. The UE only indicates 'small data' in the 2b Service Request if the eNB supports the smart tunnel. If the MME receives a 'small data' indication in the Service Request, it indicates the usage of smart tunnel to the eNB as part of the RAB setup following the service request.

FIG. 3 shows a data structure of the first embodiment of the present disclosure comprising a smart tunnel indicator element. The data structure shown in FIG. 3 is, according to one aspect of the disclosure, an IE/Message used in S1AP. As shown in FIG. 3, an indicator "SMART-TUNNEL-INDICATOR" is added to inform eNB to add or NOT add TEID-U. This smart tunnel indicator can have at least two values:

SMART-TUNNEL-INDICATOR=0 or SMART-TUNNEL-INDICATOR is NOT present, means eNB shall act according to legacy behavior.

SMART-TUNNEL-INDICATOR=1, means eNB shall encapsulate a TEID-U into first UL packet. According to an aspect the encapsulated TEID-U corresponds to the TEID-U of the eNB.

SMART-TUNNEL-INDICATOR=2, it means eNB shall encapsulate a TEID-U into an eNB generated GTP-U packet (for main scenario 2). According to an aspect the encapsulated TEID-U corresponds to the TEID-U of the eNB.

Various aspects of a GTP-U header and other data structures are shown below in Tables 1-3.

GTPUv1 extend header

TABLE 1

| Bits | | | | | | | |
|---|---|---|---|---|---|---|---|
| 8 | 7 | 6 | 5 | 4 | 3 | 2 | 1 |
| Version | | | PT | (*) | E = 1 | S | PN |

Message Type = 255
Length (1st Octet)
Length (2nd Octet)
Tunnel Endpoint Identifier (1st Octet)
Tunnel Endpoint Identifier (2nd Octet)

TABLE 1-continued

| Bits | | | | | | | |
|---|---|---|---|---|---|---|---|
| 8 | 7 | 6 | 5 | 4 | 3 | 2 | 1 |
| Version | | | PT | (*) | E = 1 | S | PN |

Tunnel Endpoint Identifier (3rd Octet)
Tunnel Endpoint Identifier (4th Octet)
Sequence Number (1st Octet)1) 4)
Sequence Number (2nd Octet)1) 4)
N-PDU Number2) 4)
Next Extension Header Type3) 4)

Note: TEID here is same as the GTP-U packets which contains dropped packets

TABLE 2

| Next Extension Header Field Value | Type of Extension Header |
|---|---|
| 0000 0000 | No more extension headers |
| 0000 0001 | Reserved - 3 Control Plane only. |
| 0000 0010 | Reserved - Control Plane only. |
| 01xx xxxx | Contains eNB TEID-U address information |
| 0100 0000 | UDP Port. Provides the UDP Source Port of the triggering message. |
| 1100 0000 | PDCP PDU Number [4]-[5]. |
| 1100 0001 | Reserved - Control Plane only. |
| 1100 0010 | Reserved - Control Plane only. |

TABLE 3

| IE/Field definition | description | Comments |
|---|---|---|
| IE ID = 01xx xxxx | Define type of IE | |
| Instance ID | Define the instance ID of this IE | |
| transportLayerAddress | eNB User plane IP for this bearer | |
| gTP-TEID | eNB TEID-U assigned for this bearer | |
| . . . | . . . | . . . |

Figure 4:
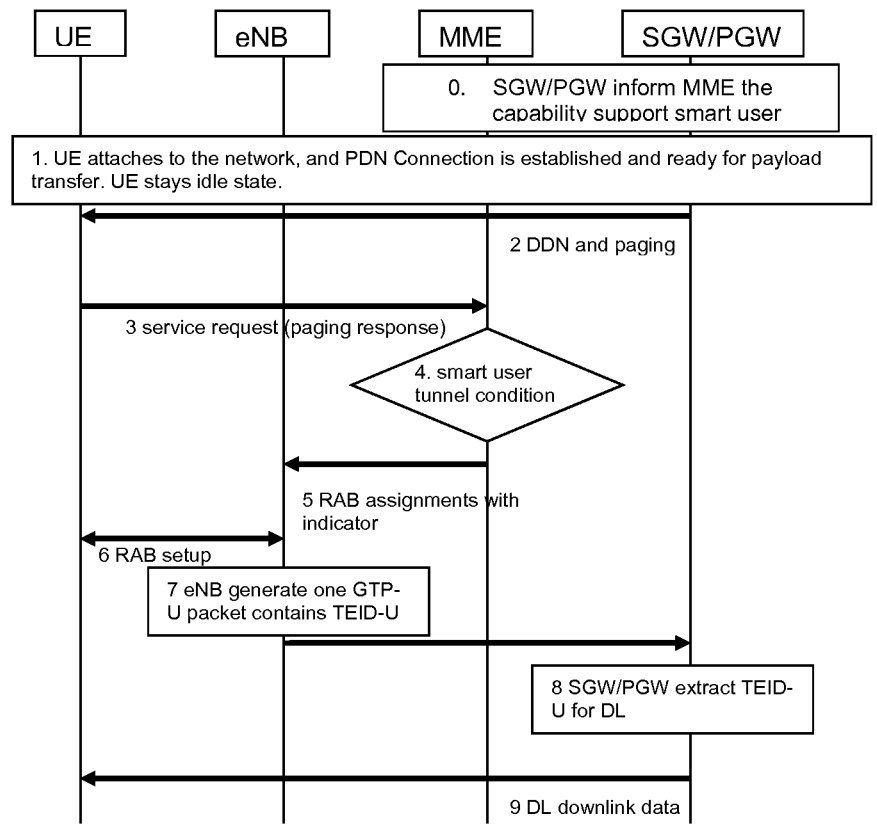
FIGS. 4-9 show different aspects of signaling diagrams of the disclosure.

FIG. 4 shows a signaling scenario according to an aspect of the first embodiment of the present disclosure where the eNB has changed and the SGW is unchanged/changed handover. According to the aspect shown in FIG. 4, the eNB implementation is extended to generate one GTP-U packet.

Note: Using DDN carries first DL packets to MME, and MME assign it eNB. eNB then will send it to UE immediately after RAB setup.

Other types here include these service request type: Signaling, MBMS types.

In these scenarios, all nodes should apply to legacy behavior as 3gpp defined.

Note: MME is responsible to indicate eNB adding UE TEID-U in first UL payload. In this service type (paging response), MME will not inform eNB to add UE TEID-U If the context in SGW/PGW has released due to being inactive for a long time, then eNB will get an Error indication from SGW/PGW. In this scenario, eNB should inform MME (via S1AP) and MME will start "modify bearer" as legacy.

An advantage of an aspect of the present disclosure is a decreased network control plane load.

An advantage of an aspect of the present disclosure is a reduced latency in the delivery of data service to, e.g., a UE of the network.

An advantage of an aspect of the present disclosure is an increase in the efficiency of RAB assignment.

According to a second embodiment a modified Service Request procedure is introduced (Service Request with ServiceType: SmallData), that establishes eNB security and provides the eNB with the SGW F-TEID in the normal way, but where the S11 signaling between the MME and the SGW is omitted. This is done by combining the present technique with the method of passing the eNB F-TEID inbound in the GTP-U (as an extension header) on the S1-U as described in a) and b) in 3GPP SA2 TR 23.887 V0.9.0 "Machine-Type and other Mobile Data Applications Communications Enhancements (Release 12)". This means that all bearer related signaling to the SGW is avoided when sending small data, and the amount of signaling the MME need to do can be reduced.

According to various aspects the Service Request is done for one specified bearer, or for multiple specified or for all existing bearers (that are small data fast path enabled (connectionless enabled)).

According to an aspect, the modified Service Request is sent every time small data has to be transmitted. That way no new security association (between UE and SGW) is required and the existing security association between the UE and the eNB can be used. Sending the modified service request every time small data has to be transmitted also avoids wasting eNB resources by storing context information in the eNB for an extended duration of time while the UE is in IDLE mode.

According to an aspect, the disclosed technique is adapted for use in EPC, i.e., in a network comprising an SGW/PGW (E-UTRAN with MME and UTRAN with S4-SGSN), but a UTRAN proposal might also be applicable for a Gn/Gp SGSN without EPC (i.e. "normal GPRS") in the case of Direct Tunnel configuration.

According to an aspect a Fast Path between the eNB and the SGW is established by an MME without any indications from the UE, i.e. without any UE impact. The MME in such an implementation makes the decision based on e.g. local configuration, or parameter(s) in the subscription information. In such a case the optimization may be applied not only on small data but any data.

Extensive service request related signaling to the SGW is avoided for small data transfers. This is a benefit as the number of M2M devices using small data may grow very large.

Reduced number of resources would be required for small data transmissions in the network, when the modified service request is combined with Small data fast path or Connectionless solutions referred to above (a & b) (note these two solutions are very similar for how data transfer is handled between the eNB and the SGW).

Common for all cases described below is that the MME (or the SGSN) does only proceeded with establishing the small data fast path if the SGW (or the GGSN in the Direct Tunnel case) supports the small data fast path. The SGW (or GGSN) has provided such a capability indication to the MME (or the SGSN) as part of the Attach procedure when the default bearer is established (or when the primary PDP context is established for the Gn/Gp GPRS case). If the UE is using additional PDN connections, the capability handshake is done when the additional PDN connection is established. This since PDN connections may use different SGWs.

Figure 5:
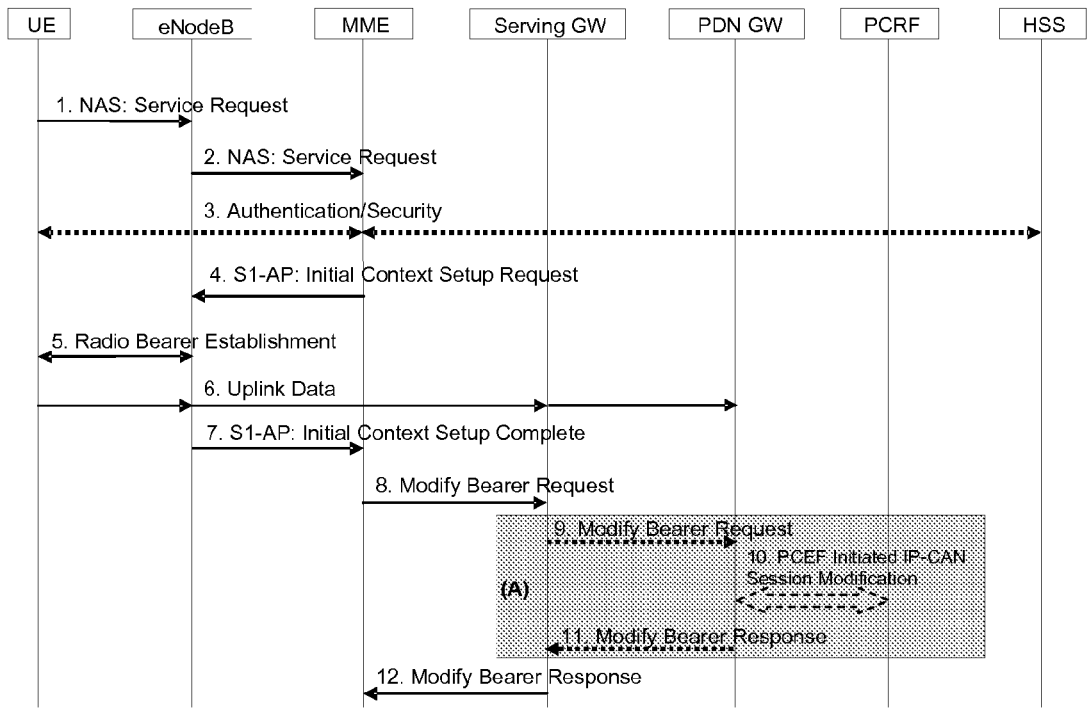
Figure 6:
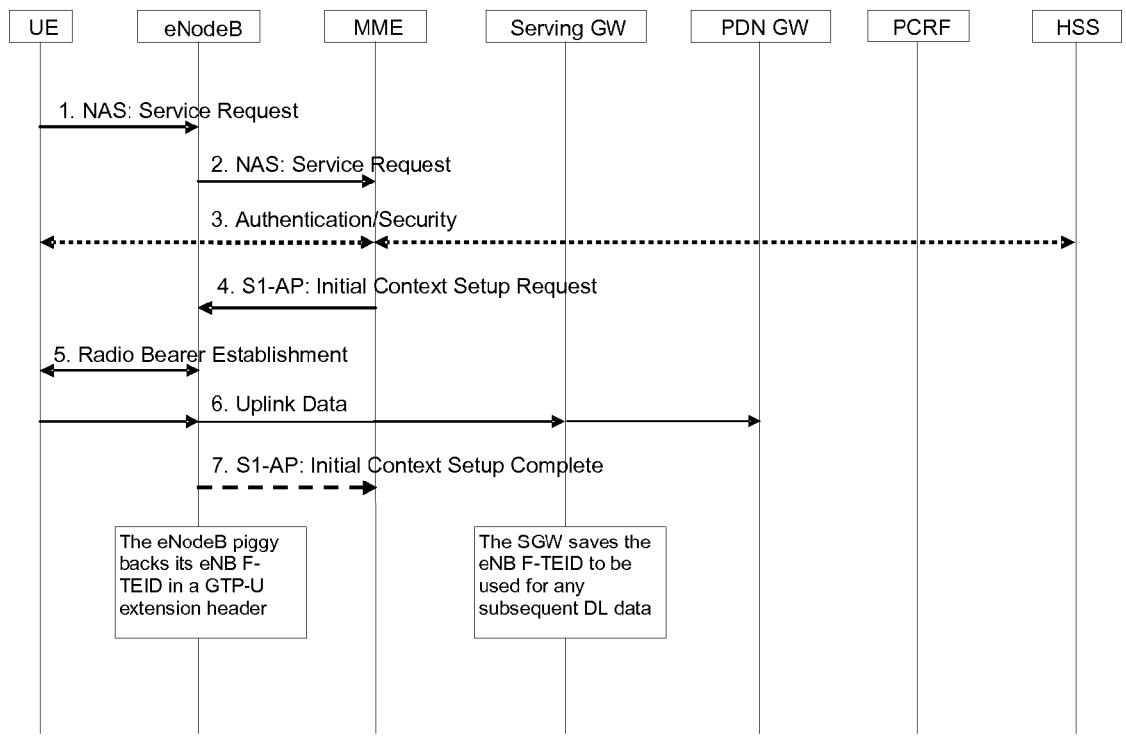
Figure 7:
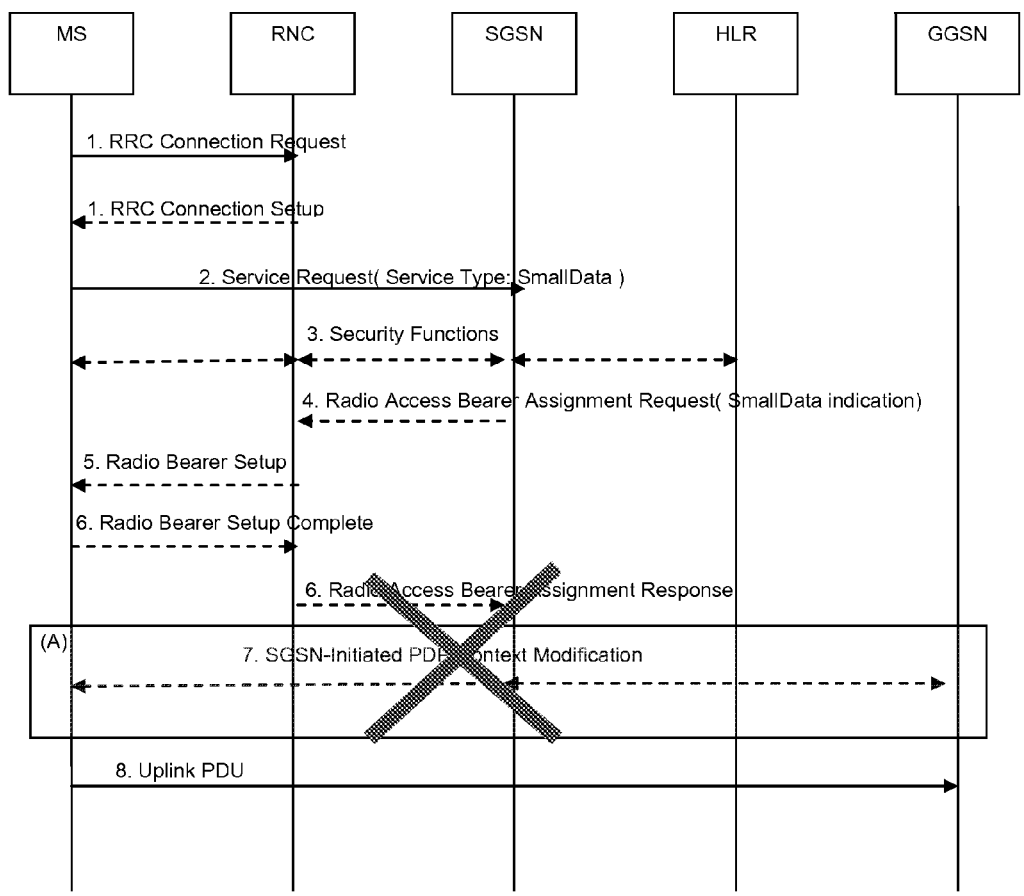
Figure 8:
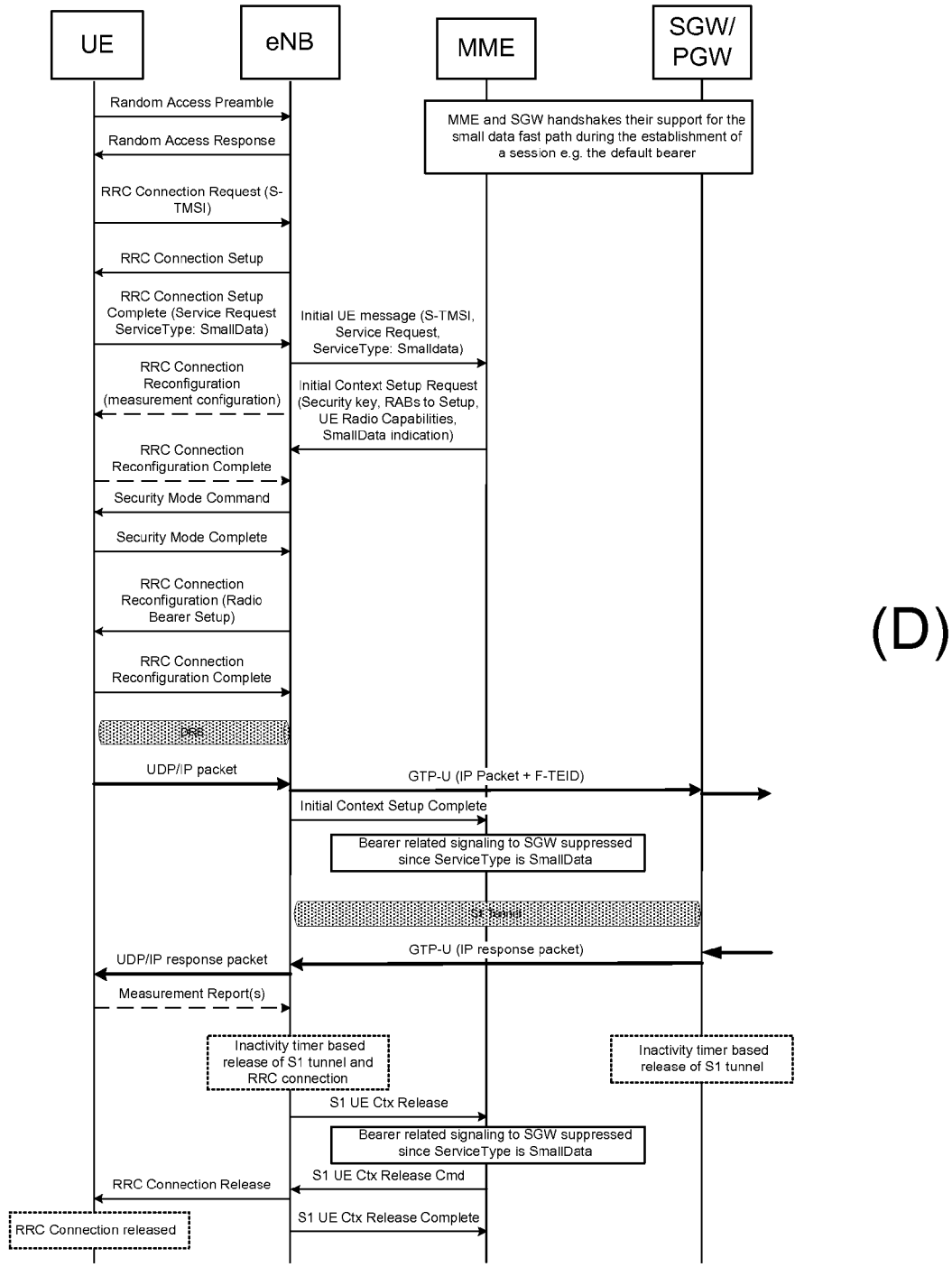
Figure 9:
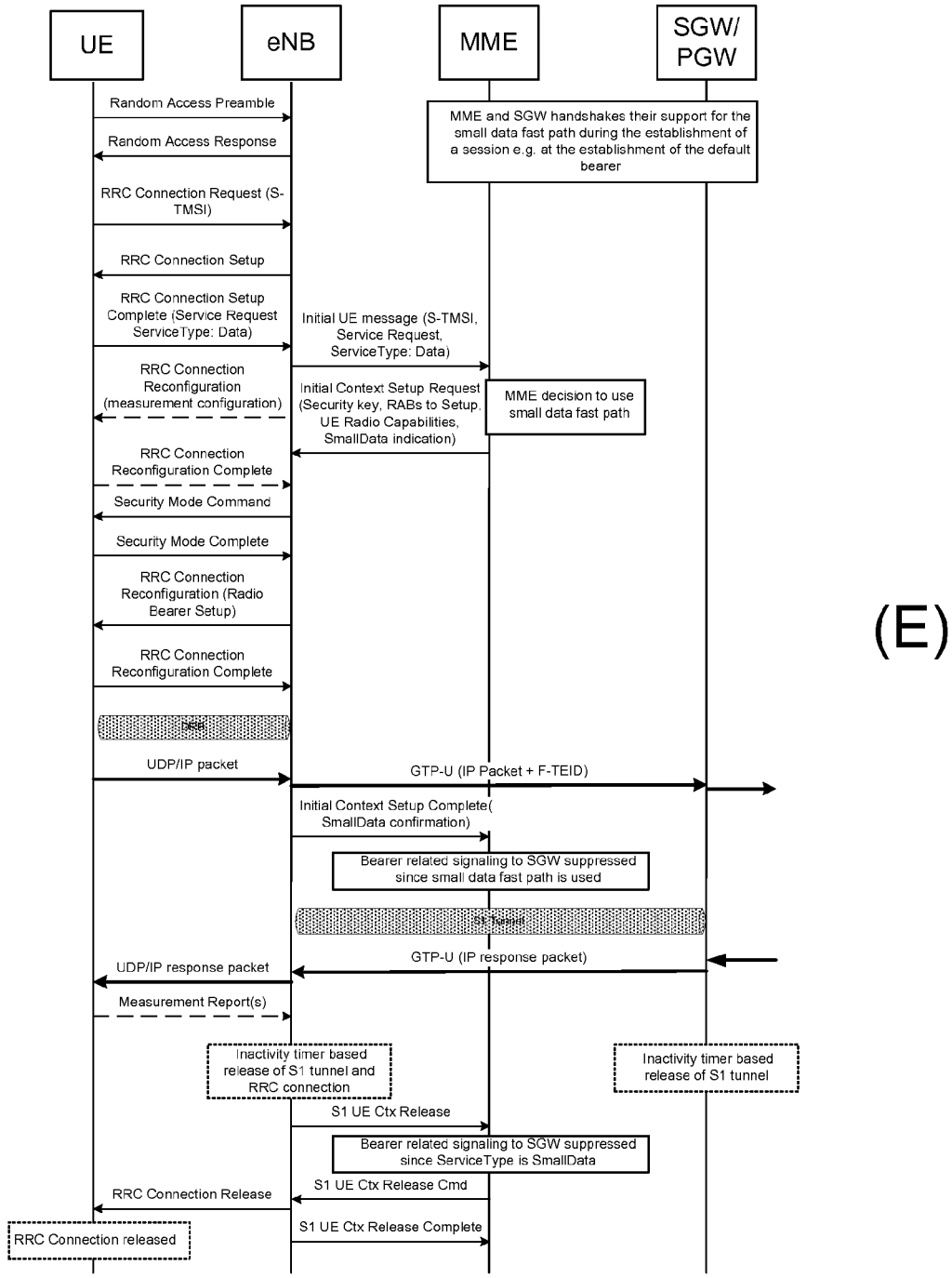

FIGS. 5-9 schematically show sequence diagrams describing different aspects of the second embodiment of the disclosure. In particular:

FIG. 5 (A) shows the existing E-UTRAN UE initiated Service request procedure from TS 23.401 V12.0.0 "GPRS enhancements for E-UTRAN access, Release-12";

FIG. 6 (B) shows the present technique applied on E-UTRAN i.e. (A);

FIG. 7 (C) Shows the present technique applied on UTRAN/EPC (TS 23.060 V12.0.0 "GPRS Service description; Stage 2 (Release 12)");

FIG. 8 (D) Shows one example aspect of a small data fast path transmission (one IP packet UL followed by a DL response IP packet) where the present technique has been applied; and FIG. 9 (E) Shows an aspect of the disclosure without UE impact, i.e. MME initiated fast path establishment.

FIG. 5 shows an E-UTRAN Service Request procedure according to prior art, in particular a UE triggered Service Request, detailed in TS 23.401 V12.0.0 "GPRS enhancements for E-UTRAN access, Release-12", sub clause 5.3.4.1.

FIG. 6 shows a modified E-UTRAN Service Request procedure according to an aspect of the disclosure. The service request procedure shown in FIG. 6 relates in particular to a UE triggered Service Request for Small Data transmission.

NOTE: For a PMIP-based S5/S8, procedure steps (A) are defined in TS 23.402. Steps 9 and 11 concern GTP-based S5/S8.

1. The UE sends NAS message Service Request towards the MME encapsulated in an RRC message to the eNodeB. When the UE intends to send small data, the Service Type is set to SmallData. In one alternative implementation the UE identifies in the NAS message to the MME one or more EPS bearers for which small data transmission shall take place. The RRC message(s) that can be used to carry the S-TMSI and this NAS message are described in 3GPP TS 36.300 "Evolved Universal Terrestrial Radio Access (E-UTRA) and Evolved Universal Terrestrial Radio Access Network (E-UTRAN)".

2. The eNodeB forwards NAS message to MME. NAS message is encapsulated in an S1-AP: Initial UE Message (NAS message, TAI+ECGI of the serving cell, S-TMSI, CSG ID, CSG access Mode). Details of this step are described in 3GPP TS 36.300 "Evolved Universal Terrestrial Radio Access (E-UTRA) and Evolved Universal Terrestrial Radio Access Network (E-UTRAN)". The Service Type of the Service Request is set to SmallData. If the MME can't handle the Service Request it will reject it. If the MME cannot handle the request for small data transmission, it will proceed as a normal service request. CSG ID is provided if the UE sends the Service Request message via a CSG cell or a hybrid cell. CSG access mode is provided if the UE sends the Service Request message via a hybrid cell. If the CSG access mode is not provided but the CSG ID is provided, the MME shall consider the cell as a CSG cell.

If a CSG ID is indicated and CSG access mode is not provided, and there is no subscription data for this CSG ID and associated PLMN or the CSG subscription is expired, the MME rejects the Service Request with an appropriate cause. The UE shall remove the CSG ID and associated PLMN of the cell where the UE has initiated the service request procedure from the Allowed CSG list, if present.

For UEs with emergency EPS bearers, i.e. at least one EPS bearer has an ARP value reserved for emergency services, if CSG access restrictions do not allow the UE to get normal services the MME shall deactivate all non-emergency bearers and accept the Service Request.

If LIPA is active for a PDN connection and if the cell accessed by the UE does not link to the L-GW where the UE initiated the LIPA PDN Connection, the MME shall not request the establishment of the bearers of the LIPA PDN connection from the eNodeB in step 4 and shall request disconnection of the LIPA PDN connection according to clause 5.10.3. If the UE has no other PDN connection then the MME shall reject the Service Request with an appropriate cause value resulting in the UE detaching, skip the following steps of the procedure and initiate the release of the core network resources with the implicit MME-initiated Detach procedure according to clause 5.3.8.3.

3. NAS authentication/security procedures as defined in clause 5.3.10 on "Security function" may be performed.

4. The MME sends S1-AP Initial Context Setup Request (Serving GW address, S1-TEID(s) (UL), EPS Bearer QoS(s), Security Context, MME Signaling Connection Id, Handover Restriction List, CSG Membership Indication) message to the eNodeB. If there is a PDN connection established for Local IP Access or SIPTO at the Local Network with L-GW function collocated with the (H)eNB, this message includes a Correlation ID for enabling the direct user plane path between the (H)eNB and the L-GW. This step activates the radio and S1 bearers for all the active EPS Bearers. The eNodeB stores the Security Context, MME Signaling Connection Id, EPS Bearer QoS(s) and S1-TEID(s) in the UE RAN context. The step is described in detail in 3GPP TS 36.300 "Evolved Universal Terrestrial Radio Access (E-UTRA) and Evolved Universal Terrestrial Radio Access Network (E-UTRAN)". Handover Restriction List is described in clause 4.3.5.7 "Mobility Restrictions".

NOTE 2: In this release of the 3GPP specification the Correlation ID is set equal to the user plane PDN GW TEID (GTP-based S5) or GRE key (PMIP-based S5) which is specified in clause 5.3.2.1 and clause 5.10.2.

According to an aspect, the MME shall only request to establish Emergency EPS Bearer if the UE is not allowed to access the cell where the UE initiated the service request procedure due to CSG access restriction.

If the Service Request is performed via a hybrid cell, CSG Membership Indication indicating whether the UE is a CSG member shall be included in the S1-AP message from the MME to the RAN. Based on this information the RAN can perform differentiated treatment for CSG and non-CSG members.

5. The eNodeB performs the radio bearer establishment procedure for selected bearer(s). The user plane security is established at this step, which is described in detail in 3GPP TS 36.300 "Evolved Universal Terrestrial Radio Access (E-UTRA) and Evolved Universal Terrestrial Radio Access Network (E-UTRAN)". When the user plane radio bearers are setup, EPS bearer state synchronization is performed between the UE and the network, i.e. the UE shall locally remove any EPS bearer for which no radio bearers are setup and, if the radio bearer for a default EPS bearer is not established, the UE shall locally deactivate all EPS bearers associated to that default EPS bearer. An indication for SmallData ServiceType is included to the UE.

6. The uplink data from the UE can now be forwarded by eNodeB to the Serving GW. The eNodeB sends the uplink data to the Serving GW address and TEID provided in the step 4. The eNB S1-U F-TEID is included in the GTP-U UL packet as an extension header (see descriptions of Small data fast path and Connectionless Data Transmission solutions in 3GPP SA2 TR 23.887 V0.8.0 "Machine-Type and other Mobile Data Applications Communications Enhancements (Release 12)"). The Serving GW stores any received eNB S1-U F-TEID and forwards the uplink data to the PDN GW.

7. In one implementation the eNodeB sends an S1-AP message Initial Context Setup Complete (eNodeB address, List of accepted EPS bearers, List of rejected EPS bearers, S1 TEID(s) (DL)) to the MME (as prior art). In another implementation (more optimized) the message is only sent if the eNB failed to establish one or more radio bearers and hence EPS bearer state synchronization needs to be performed between the eNB and the MME. This step is described in detail in 3GPP TS 36.300 "Evolved Universal Terrestrial Radio Access (E-UTRA) and Evolved Universal Terrestrial Radio Access Network (E-UTRAN)". If the Correlation ID is included in step 4, the eNodeB shall use the included information to establish a direct user plane path to the L-GW and forward uplink data for Local IP Access or SIPTO at the Local Network with L-GW function collocated with the (H)eNB accordingly According to an aspect, when the MME receives the Initial Context Setup Complete, it suppresses any further bearer related signaling to the SGW i.e. Modify Bearer Request, if small data fast path is used.

Thus, FIG. 6 illustrates an aspect of a method in a first network node (5) for handling of service requests, the method comprising the steps of: generating a service request message; transmitting the service request message to a second network node (10); establishing a radio access bearer, RAB, to the second network node (10); and transmitting an uplink data packet via said RAB to the second network node (10).

FIG. 6 also illustrates a method in a second network node for handling of service requests, the method comprising the steps of: receiving a service request message from a first network node (5); forwarding the service request message to a third network node (20); receiving a set-up request message from the third network node (20); establishing a radio access bearer, RAB, to the first network node (5); receiving an uplink data packet from the first network node (5); and adding a network identifier of the second network node (20) in a header of a data packet, and transmitting the data packet towards a fourth network node (30,40).

FIG. 6 further illustrates a method in a third network node (20) for handling of service requests, the method comprising the steps of: receiving a service request message from a second network node (10); and transmitting a set-up request message to the second network node (10).

As well as a method in a fourth network node for handling of service requests, the method comprising the steps of: receiving a data packet from a second network node (10); and storing a network identifier of the second network node (10) extracted from the data packet received from the second network node (10).

Figure 12:
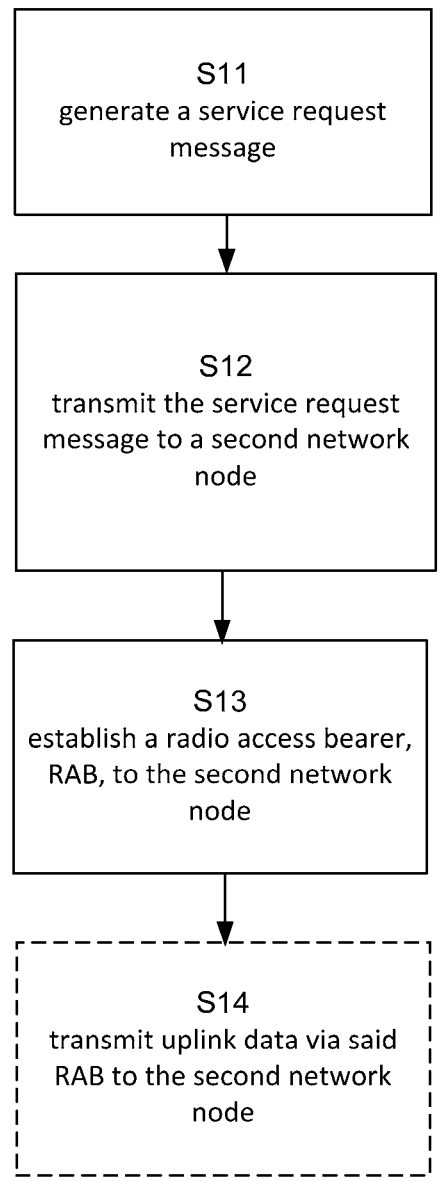
Figure 13:
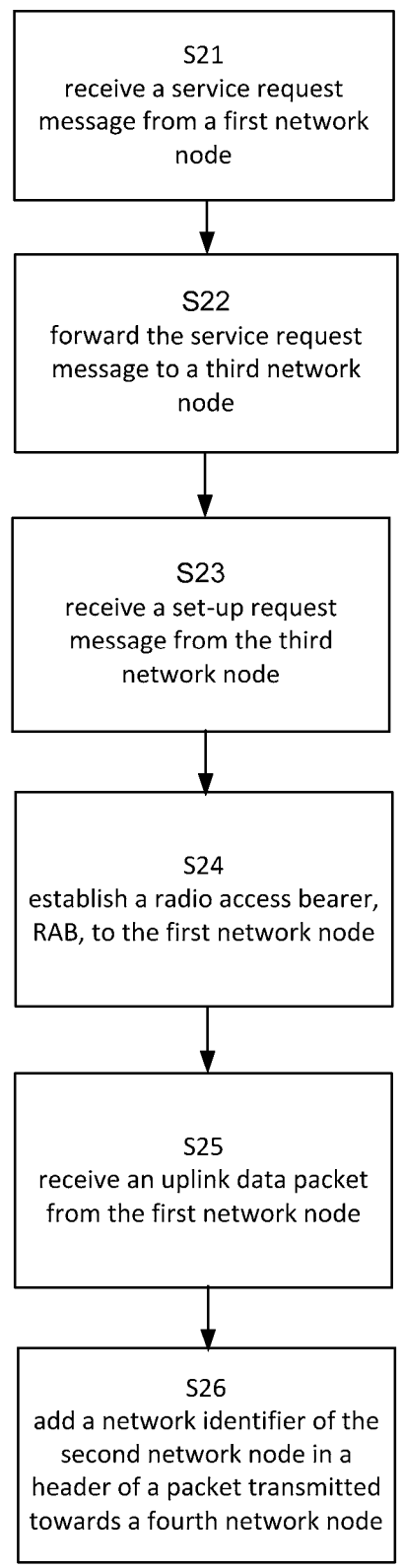

The methods illustrated in FIG. 6 are further illustrated by the flowcharts in FIGS. 12-14.

FIG. 7 shows an UTRAN Service Request procedure according to TS 23.060 V12.0.0 "GPRS Service description; Stage 2 (Release 12)", sub clause 6.12.1, with modifications as described below. For UTRAN it mainly applies to the Direct Tunnel case, and in the S4-SGSN case (not shown here). The procedure shown in FIG. 7 is an MS Initiated Service Request Procedure Using Gn/Gp.

The MS in PMM IDLE state sends the Service Request message to the 3G SGSN in order to establish the PS signaling connection for the upper layer signaling or for the resource reservation for active PDP context(s). After receiving the Service Request message, the 3G SGSN may perform authentication, and it shall perform the security mode procedure. After the establishment of the secure PS signaling connection to a 3G SGSN, the MS may send signaling messages, e.g. Activate PDP Context Request, to the 3G SGSN, or the 3G SGSN may start the resource reservation for the active PDP contexts depending on the requested service in the Service Request message. An MS in PMM CONNECTED state also requests the resource reservation for the active PDP contexts through this procedure. An MS in PMM CONNECTED state also requests the resource reservation for preserved active PDP contexts that need to transfer data but have not been allocated resources in a previous Service Request.

NOTE 1: All steps, except steps 6, 7 and 8, in FIG. 7 are common for architecture variants using Gn/Gp based interaction with GGSN and using S4 based interaction with SGW and PGW. For an S4 based interaction with SGW and PGW, procedure steps (A) are defined in clause 6.12.1A. For Service Types SmallData, the procedure steps (A) i.e. clause 6.12.1A, are not executed, except if the QoS needs to be updated.

1) The MS establishes an RRC connection, if none exists for CS traffic.

The MS shall signal a cause that indicates emergency when it requests an RRC connection for PS emergency services, as defined in TS 25.331.

2) The MS sends a Service Request (P TMSI, RAI, CKSN, Service Type) message to the SGSN. Service Type specifies the requested service. Service Type shall indicate one of the following: Data, SmallData or Signaling. The MS identifies in the NAS message to the SGSN one or more PDP contexts(s) for which small data transmission shall take place. When the Service Type indicates Data, the UE MS may also include PDP context activity information to indicate which PDP contexts need to transfer data. At this point, the SGSN may perform the authentication procedure. If the SGSN can't handle the requests of Service Type SmallData, it proceeds as a normal service request of Service Type: Data.

If Service Type indicates Data, a signaling connection is established between the MS and the SGSN, and resources for active PDP context(s) are allocated, i.e. RAB establishment for the activated PDP context(s). If Service Type indicates Signaling, the signaling connection is established between the MS and the SGSN for sending upper-layer signaling messages, e.g. Activate PDP Context Request. The resources for active PDP context(s) are not allocated.

CSG ID is provided if the MS sends the Service Request message via a CSG cell or hybrid cell. CSG access mode is provided if the MS sends the Service Request message via a hybrid cell. If the CSG access mode is not provided but the CSG ID is provided, the SGSN shall consider the cell as a CSG cell.

If a CSG ID is indicated and CSG access mode is "closed" or CSG access mode is not provided, and there is no subscription data for this CSG ID and associated PLMN or the CSG subscription is expired, the SGSN rejects the Service Request with an appropriate cause. The UE shall remove the CSG ID and associated PLMN of the cell where the UE has initiated the service request procedure from the Allowed CSG list, if present.

For MS s with emergency PDP contexts, i.e. at least one PDP Context has an ARP value reserved for emergency services, and if CSG access restrictions do not allow the MS to get normal services, the SGSN shall deactivate all non-emergency PDP contexts and accept the Service Request.

If LIPA is active for a PDP context and if the cell accessed by the MS does not link to the L-GW where the MS initiated the LIPA PDP context, the SGSN shall not request the establishment of the bearers of the LIPA PDP context from the RNC in step 4 and shall disconnect the LIPA PDP context by means of the SGSN-initiated PDP Context Deactivation Procedure according to clause 9.2.4.2.

3) The SGSN shall perform the security functions if the MS in PMM-IDLE state initiated the service request, except if the Service Type indicates SmallData.

4) If the network is in PMM-CONNECTED state and the Service Type indicates Data, the SGSN shall respond with a Service Accept message towards the MS, in case the service request can be accepted. In case Service Type indicates Data, the SGSN sends a Radio Access Bearer Assignment Request (NSAPIRAB ID(s), TEID(s), QoS Profile(s), SGSN IP Address(es), UE-AMBR, CSG Membership Indication, MSISDN, APN, Charging characteristics) message to re-establish radio access bearers for PDP contexts which do not have maximum bit rates for uplink and downlink of 0 kbit/s. If Direct Tunnel is established the SGSN provides to the RNC the GGSN's User Plane Address(es) and TEID(s) for uplink data instead of the SGSN's IP Address(es) and TEID(s). The SGSN may in addition use PDP context activity information provided by the UE in the Service Request to decide which RABs to set up. MSISDN, APN and Charging characteristics are optional parameters and only transferred if SGSN supports SIPTO at Iu-ps. For RABs belonging to a PDP context/PDN connection for Local IP Access or SIPTO at the Local Network with L-GW function collocated with the HNB, the RAB Assignment Request message includes a Correlation ID for enabling the direct user plane path between the HNB and the L GW.

NOTE 1: In this release of the 3GPP specification the Correlation ID is set equal to the user plane GGSN TEID that the Gn-SGSN has received in step 4 of clause 9.2.2.1 or the user plane PDN GW TEID that the S4-SGSN has received from the PDN GW.

NOTE 2: When using Gn-SGSN, the direct user plane path between the HNB and the L GW is enabled with the direct tunnel functionality described in clause 15.6.

If the Service Request is performed via a hybrid cell, the CSG Membership Indication indicating whether the UE is a CSG member shall be included. Based on this information, the RAN can perform differentiated treatment for CSG and non-CSG members.

If the MS is not allowed to access the cell where the MS initiated the service request due to CSG access restriction, the SGSN shall only request to establish radio access bearers for Emergency PDP contexts.

If the network is in PMM-IDLE state and the Service Type indicates SmallData, the SGSN shall respond with a Service Accept message towards the RNC, with a SmallData indication in case the service request can be accepted. The SGSN sends a Radio Access Bearer Assignment Request (NSAPI-RAB ID(s), TEID(s), QoS Profile(s), SGSN IP Address(es), UE-AMBR, CSG Membership Indication, MSISDN, APN, Charging characteristics, SmallData) message to re-establish radio access bearers for small data for PDP contexts which were specified in the Service Request and do not have maximum bit rates for uplink and downlink of 0 kbit/s.

5) The RNC indicates to the MS the new Radio Bearer Identity established and the corresponding RAB ID with the RRC radio bearer setup procedure. An indication for Service-Type SmallData is included to the MS.

6) In one implementation the SRNC responds with the Radio Access Bearer Assignment Response (RAB ID(s), TEID(s), QoS Profile(s), RNC IP Address(es)) message, but the receiving SGSN does not respond with any Modify PDP Context signaling unless QoS needs to be updated. In one alternative implementation the SRNC does not respond with any Radio Access Bearer Establishment Response at all, unless QoS needs to be updated. The GTP tunnel(s) are established on the Iu interface.

7) If the RNC returns a Radio Access Bearer Assignment Response message with a cause indicating that the requested QoS profile(s) cannot be provided, e.g. "Requested Maximum Bit Rate not Available", the SGSN may send a new Radio Access Bearer Assignment Request message with different QoS profile(s). The number of re-attempts, if any, as well as how the new QoS profile(s) values are determined is implementation dependent. For each RAB re-established with a modified QoS profile, the SGSN initiates a PDP Context Modification procedure to inform the MS and the GGSN of the new negotiated QoS profile for the corresponding PDP context. If the SGSN established Direct Tunnel in step 4) it shall initiate a PDP Context Modification procedure to the GGSN and provide to the GGSN the RNC's Address for User Plane and TEID for Downlink data and shall include the DTI to instruct the GGSN to apply Direct Tunnel specific error handling procedure as described in clause 13.8.

If SIPTO at the local network is active for a PDP context and if the cell (and for standalone GW case, the Local (H)NB ID is not the same) accessed by the UE does not link to the L-GW where the UE initiated the SIPTO at the local network PDN Connection, the SGSN shall request disconnection of the SIPTO at the Local network PDN connection(s) with the "reactivation requested" cause value according to clause 9.2.4.2.

8) The MS sends the uplink packet.

In FIG. 8 (D) a full signaling example with transferring one UL packet followed by one DL response packet is shown. It includes the E-UTRAN service request described in (B) above and the present technique applied on the sequence (A) for small data fast path. FIG. 8 shows a UE triggered Service Request of ServiceType SmallData, transmission of one UL IP packet and reception of one DL IP response packet, followed by a timer controlled S1 Release.

FIG. 9 (E) shows an alternative implementation with MME initiated fast path establishment without UE impact. That is, the Fast Path between the eNB and the SGW is established by MME without any indications from the UE. The MME may in such an implementation make the decision based on e.g. local configuration in the MME, or parameter(s) in the subscription information. In such a case the optimization may be applied not only on small data but any data.

FIG. 9 (E) shows a full signaling example with transferring one UL packet followed by one DL response packet. It includes a EUTRAN service request and the MME deciding to instruct the eNB to use the fast path. The eNB and the SGW applies the fast path according to the prior art sequence for small data fast path shown in FIG. 8 in contribution 52-130809 "Evaluation of SDDTE transmission efficiency", Ericsson 3GPP SA2 contribution and in 3GPP SA2 TR 23.887 V0.9.0 "Machine-Type and other Mobile Data Applications Communications Enhancements (Release 12)". FIG. 9 shows an MME initiated fast path establishment, followed by a timer controlled S1 Release.

Note: The MME initiated fast path may be used not only by small data transfer, but by all kinds of data transmission.

According to an aspect, a "Create session request" message is transmitted between (from) MME and (to) SGW to establish whether all involved nodes support the modified signaling method described above. The SGW then responds using a "create session response" message which comprises an indicator which indicates whether the SGW supports the modified service request procedure described above. If the indicator is not present, conventional signaling over the standard S11 interface is used according to prior art.

According to an aspect, when a service request message is received by the eNB from a UE, and the service request message is forwarded to the MME, the service request message comprises an indicator indicating whether the eNB support the modified service request procedure described above. If the eNB fails to provide said indicator, then traditional signaling using the S11 interface is used according to prior art.

Figure 10:
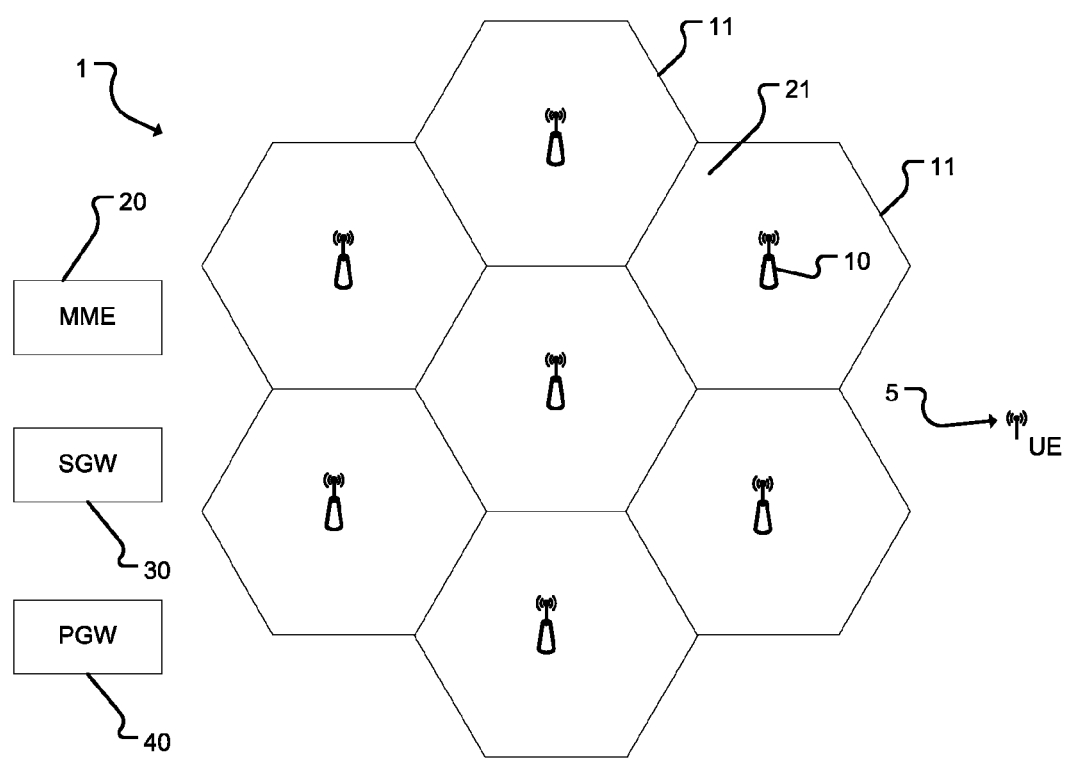
FIG. 10 shows a schematic network system overview.

FIG. 10 shows an overview of a cellular network 1. The network comprises a number of base stations 10. According to an aspect of the present disclosure the base stations are eNBs of an LTE network. The network shown in FIG. 10 further comprises an MME 20 as well as an SGW 30 and a PGW 40. The nodes of the network shown in FIG. 10 are adapted to execute the methods described above.

Figure 11:
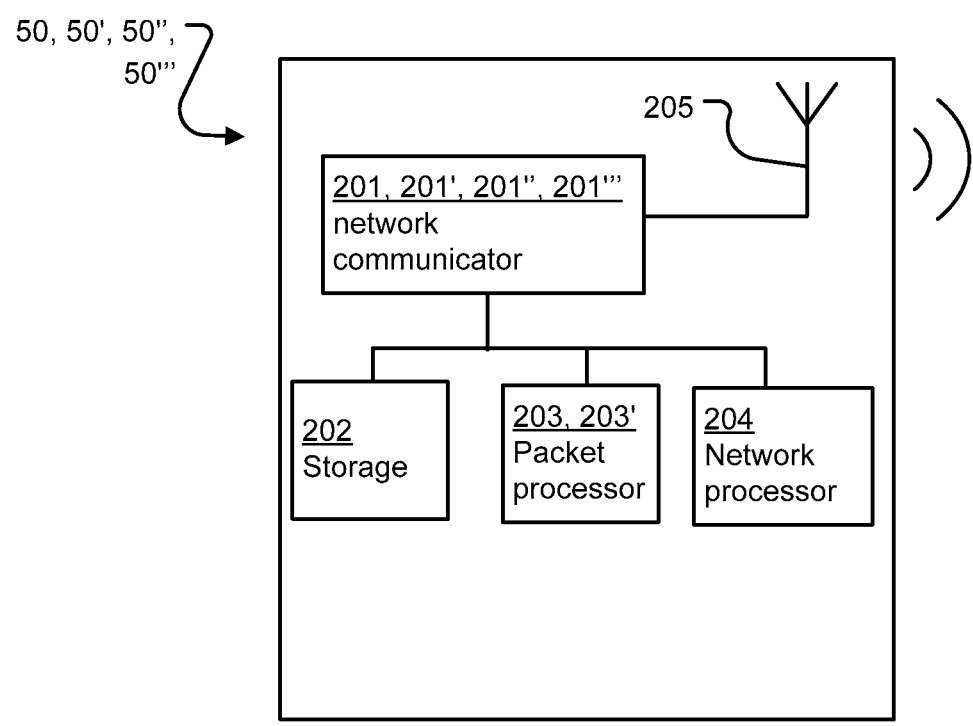
FIG. 11 shows a network node of the disclosure.

FIG. 11 shows a conceptual network node 50, 50', 50'', 50''' of the disclosure. The network node comprises a network communicator 201, 201', 201'', 201''', a storage unit 202, a packet processor 203, 203' and a network processor 204. The network node is here shown to include an antenna 205, arranged to transmit and receive wireless signals). However, it is to be understood that the network node according to aspects of the disclosure is arranged to transmit and receive wire line signals over fiber or copper transmission conduits. The network node 50, 50', 50'', 50''' is arranged to execute the methods of the present disclosure.

FIG. 12 shows a flowchart illustrating a method in a first network node for handling of service requests, the method comprising the steps of generating S11 a service request message, and transmitting S12 the service request message to a second network node 10, as well as establishing S13 a radio access bearer, RAB, to the second network node 10, and transmitting S14 an uplink data packet via said RAB to the second network node 10.

FIG. 13 shows a flowchart illustrating a method in a second network node for handling of service requests, the method comprising the steps of receiving S21 a service request message from a first network node 5, followed by forwarding S22 the service request message to a third network node 20. The method also comprises receiving S23 a set-up request message from the third network node 20, and also establishing S24 a radio access bearer, RAB, to the first network node 5, as well as receiving S25 an uplink data packet from the first network node 5. The method also comprises adding S26 a network identifier of the second network node 20 in a header of a data packet, and transmitting the data packet towards a fourth network node 30, 40, i.e., adding S26 a network identifier of the second network node 20 in a header of a packet transmitted towards a fourth network node 30,40.

FIG. 14a shows a flowchart illustrating a method in a third network node 20 for handling of service requests, the method comprising the steps of receiving S31 a service request from a second network node 10, and also transmitting S32 a set-up request message to the second network node (10).

FIG. 14b shows a flowchart illustrating a method in a fourth network node for handling of service requests, the method comprising the steps of receiving S41 uplink data from a second network node 10, and storing S42 a network identifier of the second network node 10 extracted from a data packet received from the second network node 10.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

ABBREVIATIONS

The abbreviations listed below are used throughout this disclosure. Additional abbreviations used herein and not listed below are assumed to be according to ETSI standard, as defined in the ETSI TErms and Definitions Database Interactive (TEDDI), 3GPP section.
3GPP Third Generation Partnership Program
ARPU Average Revenue Per User
CAPEX Capital Expenditure
CN Core Network
DL Down Link
DRB Data Radio Bearer
ECM EPS Connection Management
eNB Evolved Node B
EPC Enhanced Packet Core
EPS Evolved Packet System
F-TEID Fully Qualified Tunnel Endpoint Identifier
GTP-U GPRS Tunneling Protocol for User Plane
IM Instant Messaging
M2M Machine To Machine
MME Mobile Management Entity
MO Mobile Originated
MT Mobile Terminated
NAS Network Access Server
PDN Packet Data Network
PGW PDN Gateway
RAB Radio Access Bearer
RRC Radio Resource Control
SGSN Serving GPRS Support Node
SGW Serving Gateway
SRB Signaling Radio Bearer
TEID-U Tunnel Endpoint Identifier, user plane
UE User Equipment
UL Up Link
UPCON User Plane Congestion Control
UTRAN UMTS Radio Access Network

The invention claimed is:

1. A method in a first network node for handling of service requests, the method comprising the steps of:
generating a service request message, wherein the service request message comprises a Service Type indicator (STI) indicating a service type, and said STI included in said service request message indicates a SmallData service type, which is a service type that is separate and distinct from a Data service type, and said service request message does not include any small data payload;
transmitting the service request message to a second network node;
establishing a radio access bearer (RAB) to the second network node; and
transmitting an uplink data packet via said RAB to the second network node.

2. The method according to claim 1, wherein the first network node constitutes either of a user equipment (UE) node or a mobile station, MS, node.

3. The method according to claim 1, wherein the second network node constitutes either of an evolved Node B (eNB) or a radio network controller (RNC).

4. The method according to claim 1, further comprising the second network node forwarding the service request message to a third network node,
wherein the third network node is one of a mobile management entity (MME) and a Serving GPRS Support Node (SGSN).

5. The method according to claim 4, further comprising:
the second network node transmitting a data packet towards a fourth network node,
wherein the fourth network node comprises either or both of a serving gateway (SGW) and a packet data network gateway (PGW) or a gateway GPRS support node (GGSN).

6. A computer program product comprising a non-transitory computer readable medium storing computer code which, when run on an apparatus, causes the apparatus to perform the method as claimed in claim 1.

7. A method in a second network node for handling of service requests, the method comprising the steps of:
receiving a service request message from a first network node, wherein the service request message comprises a Service Type indicator (STI) indicating a service type, and said STI included in said service request message indicates a SmallData service type, which is a service type that is separate and distinct from a Data service type, and said service request message does not include any small data payload;
forwarding the service request message to a third network node;

receiving a set-up request message from the third network node;

establishing a radio access bearer (RAB) to the first network node;

receiving an uplink data packet from the first network node;

adding a network identifier of the second network node in a header of a data packet, and transmitting the data packet towards a fourth network node.

8. The method according to claim 7, wherein said network identifier comprises ark eNB F-TEID comprises in a GTP-U extension header.

9. The method according to claim 7, wherein the second network node constitutes either of an evolved Node B (eNB) or a radio network controller (RNC).

10. The method according to claim 7, wherein the third network node constitutes either of a mobile management entity (MME) node or a Serving GPRS Support Node (SGSN).

11. The method according to claim 7, wherein the fourth network node comprises either or both of a serving gateway (SGW) and a packet data network gateway (PGW) or a gateway GPRS support node (GGSN).

12. A method in a third network node for handling of service requests, the method comprising the steps of:

receiving a service request message from a second network node, wherein the service request message comprises a Service Type indicator (STI) indicating a service type, and said STI included in said service request message indicates a SmallData service type, which is a service type that is separate and distinct from a Data service type, and said service request message does not include any small data payload; and transmitting a set-up request message to the second network node.

13. The method according to claim 12, wherein the second network node constitutes either of an evolved Node B (eNB) or a radio network controller (RNC).

14. The method according to claim 12, wherein the third network node constitutes either of a mobile management entity (MME) node or a Serving GPRS Support Node (SGSN).

15. The method according to claim 12, further comprising the second network node transmitting a data packet to a fourth network node, wherein the fourth network node comprises either or both of a serving gateway (SGW) and a packet data network gateway (PGW), or a gateway GPRS support node (GGSN).

16. A method for handling of service requests, the method comprising the steps of:

a second network node receiving a service request message from a first network node, wherein the service request message comprises a Service Type indicator (STI) indicating a service type, and said STI included in said service request message indicates a SmallData service type, which is a service type that is separate and distinct from a Data service type, and said service request message does not include any small data payload;

receiving a data packet transmitted by the second network node;

extracting a network identifier of the second network node extracted from the data packet received from the second network node; and storing the network identifier of the second network node extracted from the data packet received from the second network node.

17. A first network node configured for handling of service requests, the first network node comprising:

a packet processor;

a network processor; and a network communicator, wherein the packet processor is arranged to generate a service request message, wherein the service request message comprises a Service Type indicator (STI) indicating a service type, and said STI included in said service request message indicates a SmallData service type, which is a service type that is separate and distinct from a Data service type and said service request message does not include any small data payload, the network communicator is arranged to transmit the service request message to a second network node, and the network communicator is further arranged to establish a radio access bearer (RAB) to the second network node, as well as to transmit uplink data via said RAB to the second network node.

18. A second network node configured for handling of service requests, the second network node comprising:

a packet processor; and a network communicator, wherein the network communicator is arranged to:

receive a service request message from a first network node, wherein the service request message comprises a Service Type indicator (STI) indicating a service type, and said STI included in said service request message indicates a SmallData service type, which is a service type that is separate and distinct from a Data service type, and said service request message does not include any small data payload, forward the service request message to a third network node, receive a set-up request message from the third network node, establish a radio access bearer (RAB) to the first network node, and receive an uplink data packet from the first network node, and the packet processor is arranged to add a network identifier of the second network node in a header of a packet transmitted towards a fourth network node.

19. A third network node configured for handling of service requests, the third network node comprising a network communicator, the network communicator being arranged to receive a service request from a second network node and to transmit a set-up request message to the second network node, wherein the service request message comprises a Service Type indicator (STI) indicating a service type, and said STI included in said service request message indicates a SmallData service type, which is a service type that is separate and distinct from a Data service type, and said service request message does not include any small data payload.

* * * * *